United States Patent
Faaborg et al.

(10) Patent No.: US 9,037,455 B1
(45) Date of Patent: May 19, 2015

(54) LIMITING NOTIFICATION INTERRUPTIONS

(71) Applicant: Google Inc., Mountain View, CA (US)

(72) Inventors: Alexander Faaborg, Mountain View, CA (US); Tristan Harris, Santa Rosa, CA (US); Austin Robison, Sunnyvale, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 14/150,391

(22) Filed: Jan. 8, 2014

(51) Int. Cl.
*G10L 21/00* (2013.01)

(52) U.S. Cl.
CPC ..................... *G10L 21/00* (2013.01)

(58) Field of Classification Search
CPC ..... G10L 15/20; G10L 25/78; G10L 21/0216; G10L 15/04; G10L 2021/00; G10L 15/22; G10L 15/01; G10L 15/02; G10L 15/10; G06Q 10/109; G06Q 10/107; G06F 3/0481; G06F 3/0482; G06F 3/04847; G06F 3/04883
USPC .............. 704/208, 221, 233, 228, 270.1, 275, 704/E15.045
See application file for complete search history.

(56) References Cited

U.S. PATENT DOCUMENTS

| | | | | |
|---|---|---|---|---|
| 4,975,962 | A * | 12/1990 | Oka ............................... | 704/241 |
| 5,765,130 | A * | 6/1998 | Nguyen ........................ | 704/233 |
| 6,249,759 | B1 * | 6/2001 | Oda .............................. | 704/222 |
| 6,330,539 | B1 * | 12/2001 | Takayama et al. ............ | 704/275 |
| 6,393,272 | B1 * | 5/2002 | Cannon et al. ................ | 455/413 |
| 6,882,973 | B1 * | 4/2005 | Pickering ...................... | 704/270 |
| 7,024,353 | B2 * | 4/2006 | Ramabadran .................. | 704/205 |
| 7,069,221 | B2 * | 6/2006 | Crane et al. ................... | 704/275 |
| 7,162,421 | B1 * | 1/2007 | Zeppenfeld et al. .......... | 704/233 |
| 7,194,409 | B2 * | 3/2007 | Balentine et al. ............. | 704/253 |
| 7,243,130 | B2 * | 7/2007 | Horvitz et al. ................ | 709/207 |
| 7,283,808 | B2 * | 10/2007 | Castell et al. ................. | 455/413 |
| 7,392,188 | B2 * | 6/2008 | Junkawitsch et al. ......... | 704/251 |
| 7,437,286 | B2 * | 10/2008 | Pi et al. ......................... | 704/233 |
| 7,606,536 | B1 * | 10/2009 | Koenck et al. .................. | 455/78 |
| 8,619,965 | B1 * | 12/2013 | Figa et al. ................ | 379/215.01 |
| 8,682,304 | B2 * | 3/2014 | Doulton ..................... | 455/414.4 |
| 8,731,912 | B1 * | 5/2014 | Tickner et al. ................ | 704/208 |
| 2002/0054117 | A1 * | 5/2002 | van Dantzich et al. ....... | 345/766 |
| 2002/0087649 | A1 * | 7/2002 | Horvitz ......................... | 709/207 |
| 2003/0039338 | A1 * | 2/2003 | Erb et al. .................. | 379/88.01 |

(Continued)

OTHER PUBLICATIONS

Shamsi et al "Effect of Intelligent notification Management on Users and Their Tasks", CHI 2008 Proceedings. Don't interrupt Me; Apr. 5-10, 2008, pp. 93-102.*

(Continued)

*Primary Examiner* — Abdelali Serrou
(74) *Attorney, Agent, or Firm* — Shumaker & Sieffert, P.A.

(57) ABSTRACT

Techniques for a computing device operating in limited-access states are provided. One example method includes determining, by a computing device, that a notification is scheduled for output by the computing device during a first time period and that a pattern of audio detected during the first time period is indicative of human speech. The method further includes delaying output of the notification during the first time period and determining that a pattern of audio detected during a second time period is not indicative of human speech. The method also includes outputting at least a portion of the notification at an earlier in time of an end of the second time period or an expiration of a third time period.

19 Claims, 4 Drawing Sheets

(56) References Cited

U.S. PATENT DOCUMENTS

| | | | | |
|---|---|---|---|---|
| 2003/0055768 | A1* | 3/2003 | Anaya et al. | 705/36 |
| 2004/0030753 | A1* | 2/2004 | Horvitz | 709/206 |
| 2004/0267525 | A1* | 12/2004 | Lee et al. | 704/208 |
| 2006/0123360 | A1* | 6/2006 | Anwar et al. | 715/810 |
| 2006/0262719 | A1* | 11/2006 | Cao et al. | 370/229 |
| 2006/0286993 | A1* | 12/2006 | Xie et al. | 455/518 |
| 2007/0086365 | A1* | 4/2007 | Chen et al. | 370/260 |
| 2007/0127704 | A1* | 6/2007 | Marti et al. | 379/373.01 |
| 2007/0243893 | A1* | 10/2007 | Takahashi et al. | 455/518 |
| 2010/0058231 | A1* | 3/2010 | Duarte et al. | 715/800 |
| 2010/0280827 | A1* | 11/2010 | Mukerjee et al. | 704/236 |
| 2011/0102172 | A1* | 5/2011 | Chiu et al. | 340/539.11 |
| 2011/0154391 | A1* | 6/2011 | Velazquez et al. | 725/33 |
| 2011/0167382 | A1* | 7/2011 | van Os | 715/800 |
| 2011/0282658 | A1* | 11/2011 | Wang et al. | 704/208 |
| 2011/0298614 | A1* | 12/2011 | Bells | 340/539.13 |
| 2012/0163630 | A1* | 6/2012 | Yano et al. | 381/107 |
| 2012/0311045 | A1* | 12/2012 | Sylvain | 709/206 |
| 2013/0021950 | A1* | 1/2013 | Chen et al. | 370/260 |
| 2013/0145303 | A1* | 6/2013 | Prakash et al. | 715/779 |
| 2013/0160049 | A1 | 6/2013 | Yamauchi | |

OTHER PUBLICATIONS

"One of Android's all-time most annoying issues still exists: notification sounds interrupt music playback. Please star this issue to encourage Google to fix it", REDDIT [online]. Posted Apr. 2, 2013. Retrieved from the Internet: <http://www.reddit.com/r/Android/comments/1bi32i/> 15 pgs.

Basel qabouq, "How do i stop notifications from ringing while im on a phone call on the iphone 4s", Apple Support Communities [online]. Posted Feb. 19, 2012. Retrieved from the Internet: <https://discussions.apple.com/thread/3747787?tstart=0> 3 pgs.

"Delay Notifier—Android Apps on Google Play", piyota [online]. May 21, 2012. Retrieved from the Internet: <https://play.google.com/store/apps/details?id=jp.gr.java_conf.piyota.delaynotifier&hl=en> 2 pgs.

"iPod touch, for iOS 6.1 Software", Apple [User Guide]. Jun. 2013. 138 pgs.

"Pushover—Android Apps on Google Play", Superblock, LLC [online]. Aug. 28, 2013. Retrieved from the Internet: <https://play.google.com/store/apps/details?id=net.superblock.pushover&hl=en> 2 pgs.

Wilson et al., "Reducing Interruption Cost Using Slow-Growth Notifications", MIT Computer Science and Artificial Intelligence Lab [online]. First Accessed on: Sep. 5, 2013. Retrieved from the Internet: <http://groups.csail.mit.edu/uid/projects/slowgrowth/slow-growth-technote.pdf> 4 pgs.

cassidyg, "Text messages received interrupt other activities", Verizon Wireless [online]. Posted Jun. 4, 2012. Retrieved from the Internet: <https://community.verizonwireless.com/thread/774750> 1 pg.

* cited by examiner

LIMITING NOTIFICATION INTERRUPTIONS

BACKGROUND

Computing devices (e.g., mobile phones, tablet computers, global positioning system (GPS) devices, etc.) can generally perform various functions, such as executing applications stored thereon and outputting information. For example, an application may output documents, e-mails, pictures, etc. for display on a screen and/or audio for output by a speaker. Certain computing devices output notifications that provide information related to, for example, a condition of the computing device, one or more applications executed by the computing device, a time, or a location of the computing device. In some examples, these notifications are outputted at an inopportune time and may interrupt a function of the computing device or a non-computing task currently being engaged in by a user of the computing device.

SUMMARY

In one example, the disclosure is directed to a method determining, by a computing device, that a notification is scheduled for output by the computing device during a first time period. The method also includes determining, by the computing device, that a pattern of audio detected during the first time period is indicative of human speech and delaying, by the computing device and in response to determining that the pattern of audio detected during the first time is indicative of human speech, output of the notification during the first time period. The method additionally includes determining, by the computing device, that a pattern of audio detected during a second time period is not indicative of human speech. The method further includes outputting, by the computing device, at least a portion of the notification at an earlier in time of an end of the second time period or an expiration of a third time period.

In another example, the disclosure is directed to a computing device comprising a microphone, an output device, and one or more processors. The one or more processors are operable to monitor audio detected by the microphone, wherein the audio is detected during at least a first time period and a second time period. The one or more processors are further operable to determine that a notification is scheduled for output by the computing device during a first time period and determine that a pattern of audio detected during the first time period is indicative of human speech. In response to determining that the pattern of audio detected during the first time is indicative of human speech, the one or more processors are further operable to delay output of the notification during the first time period. The one or more processors are further operable to determine that a pattern of audio detected during a second time period is not indicative of human speech and output at least a portion of the notification at an earlier in time of an end of the second time period or an expiration of a third time period.

In another example, the disclosure is directed to a computer-readable storage medium encoded with instructions that, when executed by one or more processors of a computing device, cause the one or more processors to determine that a notification is scheduled for output by the computing device during a first time period. The instructions further cause the one or more processors to determine that a pattern of audio detected during the first time period is indicative of human speech. In response to determining that the pattern of audio detected during the first time is indicative of human speech, the instructions further cause the one or more processors to delay output of the notification during the first time period. The instructions further cause the one or more processors to determine that a pattern of audio detected during a second time period is not indicative of human speech and output at least a portion of the notification at an earlier in time of an end of the second time period or an expiration of a third time period.

The details of one or more examples are set forth in the accompanying drawings and the description below. Other features, objects, and advantages of the disclosure will be apparent from the description and drawings, and from the claims.

DETAILED DESCRIPTION

Techniques of this disclosure are directed to a computing device configured to delay output of a notification. A notification may be any output (e.g., visual, auditory, tactile, etc.) that a computing device provides to convey information. In some implementations, a computing device may delay outputting a notification at a first time because the computing device determines that detected ambient noise has a pattern indicative of human speech. For example, the computing device does not output an audio notification during a time period in which the computing device determines that speech is taking place in proximity to the computing device. In some implementations, the computing device delays outputting the audio notification until the computing device determines that audio data detected during a second time period do not have a pattern indicative of human speech. When the computing device determines there is no detected audio pattern indicative of human speech, the computing device outputs at least part of the notification.

Figure 1:
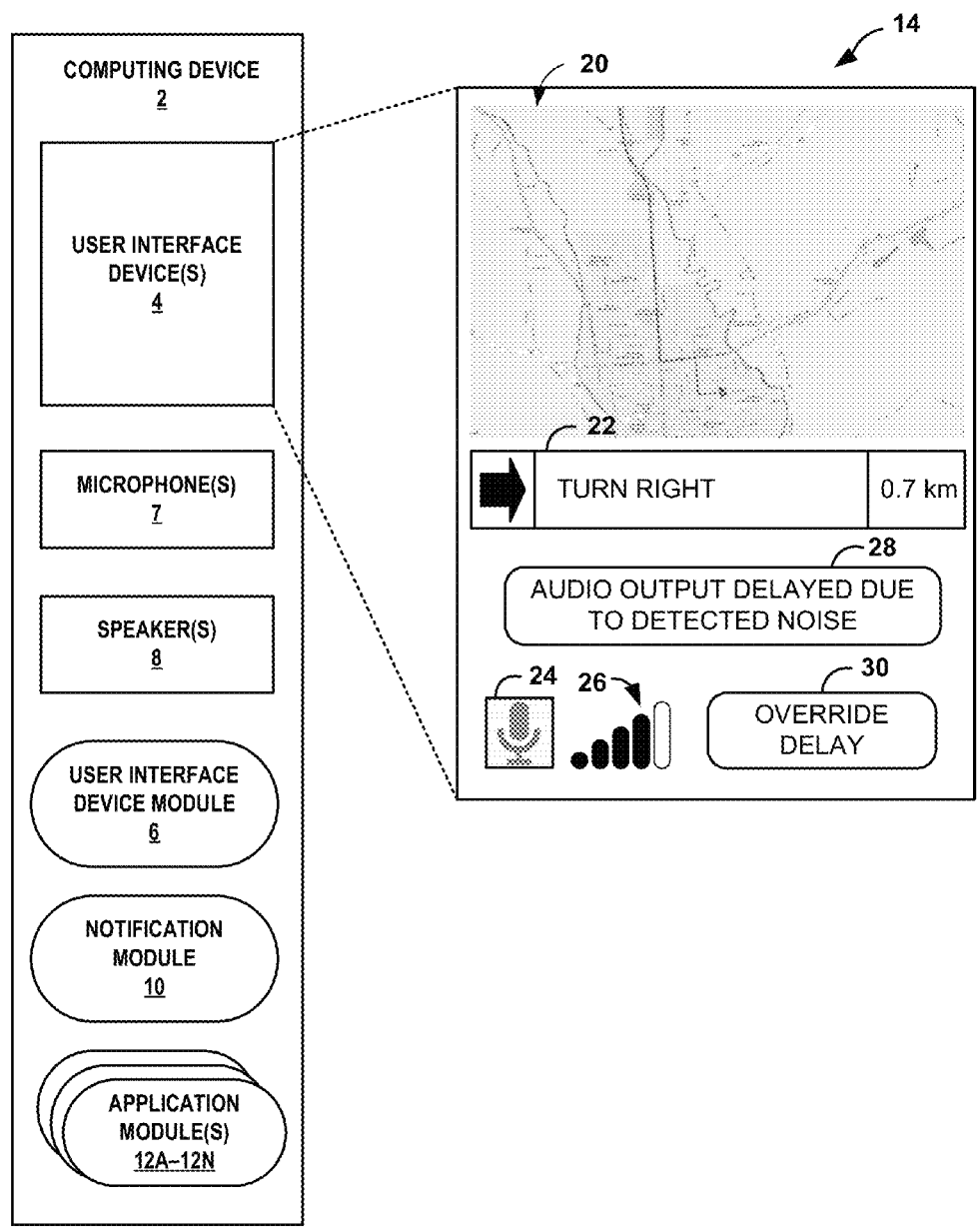
FIG. 1 is a conceptual diagram illustrating an example computing device that is configured to delay output of a notification, in accordance with one or more aspects of the present disclosure.

FIG. 1 is a conceptual diagram illustrating an example computing device 2 that is configured to delay output of a notification, in accordance with one or more aspects of the present disclosure. In the example of FIG. 1, computing device 2 is illustrated as a mobile computing device. However, in other examples, computing device 2 may be a desktop computer, a mainframe computer, tablet computer, a personal digital assistant (PDA), a laptop computer, a portable gaming device, a portable media player, an e-book reader, a watch, television platform, a global positioning system (GPS) receiver, or another type of computing device.

Computing device 2 includes one or more user interface devices (UIDs) 4. For clarity, singular terms may be used herein for features where, in some examples, there may be two or more of those features. UID 4 of computing device 2 may function as an input device and as an output device for computing device 2. UID 4 may be implemented using various technologies. For instance, UID 4 may function as an input device using a presence-sensitive display, such as a resistive touchscreen, a surface acoustic wave touchscreen, a capacitive touchscreen, a projective capacitance touchscreen, a pressure sensitive screen, an acoustic pulse recognition touchscreen, or another presence-sensitive display technology. UID 4 may function as an output device using any one or more of a liquid crystal display (LCD), plasma display, dot matrix display, light emitting diode (LED) display, organic light-emitting diode (OLED) display, electronic ink, or similar monochrome or color display capable of outputting visible information, such as to a user of computing device 2.

UID 4 of computing device 2 may include a presence-sensitive display that may receive both tactile and motion-based input from, for example, a user of computing device 2. UID 4 may receive indications of the tactile user input by detecting one or more tap and/or non-tap gestures from a user of computing device 2 (e.g., the user touching or pointing to one or more locations of UID 4 with a finger or a stylus pen or the user holding computing device 2 by touching UID 4). The presence-sensitive display of UID 4 may present output to a user. UID 4 may present the output as a user interface which may be related to functionality configured into computing device 2. For example, UID 4 may present various user interfaces of applications (e.g., an electronic message application, an Internet browser application, etc.) executing at computing device 2. A user of computing device 2 may interact with one or more of these applications to perform a function with computing device 2 through the respective user interface of each application. Furthermore, UID 4 may present various notifications, which may provide information related to one or more applications executing at computing device 2.

Computing device 2 may also include one or more microphones 4 and one or more speakers 6. Microphone 4 detects audio incident upon microphone 4, such as, for example, in an environment of computing device 2. Microphone 4 may detect an ambient noise level of the audio. Further, microphone 4 may detect audio over one or more time periods. In some examples, microphone 4 may continuously monitor for audio. In some examples, microphone 4 monitors audio only when an ambient noise level is above a noise level threshold.

Computing device 2 may include user interface device module 6, notification module 10, and application modules 12A-12N (collectively referred to herein as "application modules 12"). Modules 6, 10, and 12 may perform operations described using software, hardware, firmware, or a mixture of both hardware, software, and firmware residing in and executing on computing device 2. Computing device 2 may execute modules 6, 10, and 12 with multiple processors. Computing device 2 may execute modules 6, 10, and 12 as a virtual machine executing on underlying hardware.

UID module 6 may cause UID 4 to present graphical user interface 14 (referred to herein as "user interface 14"). User interface 14 includes graphical elements 20, 22, 24, 26, 28, and 30 displayed at various locations of UID 4. FIG. 1 illustrates an example user interface 14 providing an indication that computing device 2 has delayed a notification for a navigation application that computing device 2 is executing.

In the example of FIG. 1, user interface 14 includes element 20 that is an image of a map having a route imposed thereon. Element 22 indicates an upcoming direction that, if taken, follows the route indicated in element 20. For example, element 22 depicts an icon of an arrow pointed to the right, a direction "turn right" and a distance of 0.7 kilometers ("km") to the turn. Computing device 2 may generate an audio notification that includes information indicative of the direction, such as a computer-generated voice that says "turn right." The example elements shown in FIG. 1 are merely included for illustrative purposes; computing device 2 may display other, different elements.

User interface 14 also includes an icon 24 that is, in the example of FIG. 1, an image of a microphone. The presence of icon 24 in user interface 14 may indicate that microphone 7 is powered on and currently capable of detecting audio. Graphical element 26 functions as a visual signal strength indicator for microphone 7. In the example of FIG. 1, graphical element 26 indicates the strength or volume of the audio that microphone 7 receives through computing device 2 the color of bars shown in graphical element 26. For example, graphical element 26 is showing four out of five bars with a dark color, indicating that microphone 7 received an ambient noise level that is relatively high. This may be because, for example, a user of computing device 2 may be participating in a conversation near microphone 7.

User interface 14 may also include graphical element 28 that provides an indication that an audio notification is delayed. For example, graphical element 28 may be a pop-up window that provides information such as "audio output delayed due to detected noise" that is displayed during a time period when computing device 2 is delaying output of the audio notification. In that example, computing device 2 has determined that the time period, or time instance as it may be, is not suitable for outputting an audio notification. For example, computing device 2 may have determined that an ambient noise level is too high at the time, such that the audio notification likely could not be heard if computing device 2 outputted it at that time via one or more speakers 8. Thus, computing device 2 temporarily delays output of the audio notification until either computing device 2 determines the ambient noise level is low enough, that the detected audio is not indicative of human speech, or that a time period for maximum delay of the notification has expired.

In some examples, an option may be provided to turn off the delay notification functionality of computing device 2. User interface 14 includes graphical element 30 that provides an option to override the delay of the notification. In some examples, graphical element 30 is an interactive graphical element, such as, for example, a touch-target that may be toggled by touching user interface 14 at approximately the location of graphical element 30. When computing device 2 determines graphical element 30 has been interacted with, computing device 2 may output the audio notification despite the ambient noise level or a detected pattern indicative of human speech.

In some examples, the delay notification functionality of computing device 2 may be turned on or off, and/or settings may be adjusted for how computing device 2 performs the delay notification functionality. For example, a maximum time period for which a notification may be delayed may be set by a user. Additionally, in some examples, user interface 14 may not include any of one or more of graphical elements 20-30. In other examples, user interface 14 may include other graphical elements.

UID module 6 may act as an intermediary between various components of computing device 2 to make determinations based on input detected by UID 4 and to generate output presented by UID 4. For instance, UID module 6 may receive an indication of user input received at user interface 14. UID module 6 may receive, as an input from input module 10, a sequence of touch events generated from user input detected at UID 4. UID module 6 may determine, based on the location components in the sequence touch events, which of one or more location components approximate a selection of one or more graphical elements (e.g., UID module 6 may determine the location of one or more of the touch events corresponds to an area of UID 4 that presents graphical element 30 used to override the delayed output of the audio notification). UID module 6 may provide, as input to notification module 10, the sequence of touch events received at user interface 14, including the locations where UID 4 presents each of the graphical elements 20-30. In response, UID module 6 may receive, as an output from notification module 10, instructions for updating user interface 14 based on the indication of user input received at user interface 14. UID module 6 may update user interface 14 to reflect the status of audio notifications. UID module 6 may cause UID 4 to present an updated user interface 14.

Computing device 2 may further include one or more application modules 12. Application modules 12 may include any other application that computing device 2 may execute in addition to the other modules specifically described in this disclosure. For example, application modules 12 may include a web browser, a media player, a file system, a navigation program, a communication program, or any other number of applications or features that computing device 2 may execute. Application modules 12 may determine that notifications should be provided related to a particular application. In some examples, an application run via an application module 12 determines a notification should be provided. In some examples, application modules 12 may detect one or more events that trigger output of a notification. An event requiring a notification as detected by application module 12 may include, for example, receiving an email message, receiving a text message, receiving a phone call, a clock alarm, a calendar reminder, etc. The corresponding notifications may be audio, visual, haptic feedback, or any other form of output. In accordance with the techniques of this disclosure, notification module 10 may interact with application module 12 of computing device 2 to delay output of the notifications in certain circumstances, as described herein. Application module 12 may provide one or more signals to notification module 10 responsive to application module 12 determining a notification to be outputted. The one or more signals may include information of what the notification should include and what time to output the notification. Notification module 10 delays output of the notification in response to determining that the time period in which the notification is meant to be output overlaps with a time period in which the detected conditions indicate the time period is an inopportune time to output the notification.

In the example of FIG. 1, computing device 2 outputs for display a user interface 14 for display at a presence-sensitive display. As described above, FIG. 1 illustrates an example user interface 14 that provides graphical elements 20-30. UID module 6 may generate user interface 14 and include graphical elements 20-30 in user interface 14. UID module 6 may send information to UID 4 that includes instructions for displaying user interface 14 at a presence-sensitive device of UID 4. UID 4 may receive the information and cause the presence-sensitive device of UID 4 to present user interface 14 including one or more of graphical elements 20-30.

While computing device 2 presents user interface 14, notification module 10 of computing device 2 may receive information from microphone 7 about detected audio signals, such as an ambient noise level or a pattern of audio. Based on information about the detected audio, notification module 10 may determine whether to delay a notification. Notification module 10 may further determine, based on additional detected audio, whether to output the delayed notification.

In this way, the techniques of the disclosure may enable a computing device to delay outputting notifications to avoid outputting the notifications at inopportune times. For example, computing device 2 configured with techniques of the disclosure may delay outputting an audio notification during a time period in which computing device 2 determines that circumstances may prevent the audio from being heard. The techniques described herein provide an increased likelihood that computing device 2 would output the audio at a time when a user may hear and understand the notification. Additionally, in some examples, the techniques described herein may prevent an action performed by a user with computing device 2, such as a scroll function, from being interrupted with a notification. Thus, computing device 2 using techniques described herein may provide an improved user experience.

Figure 2:
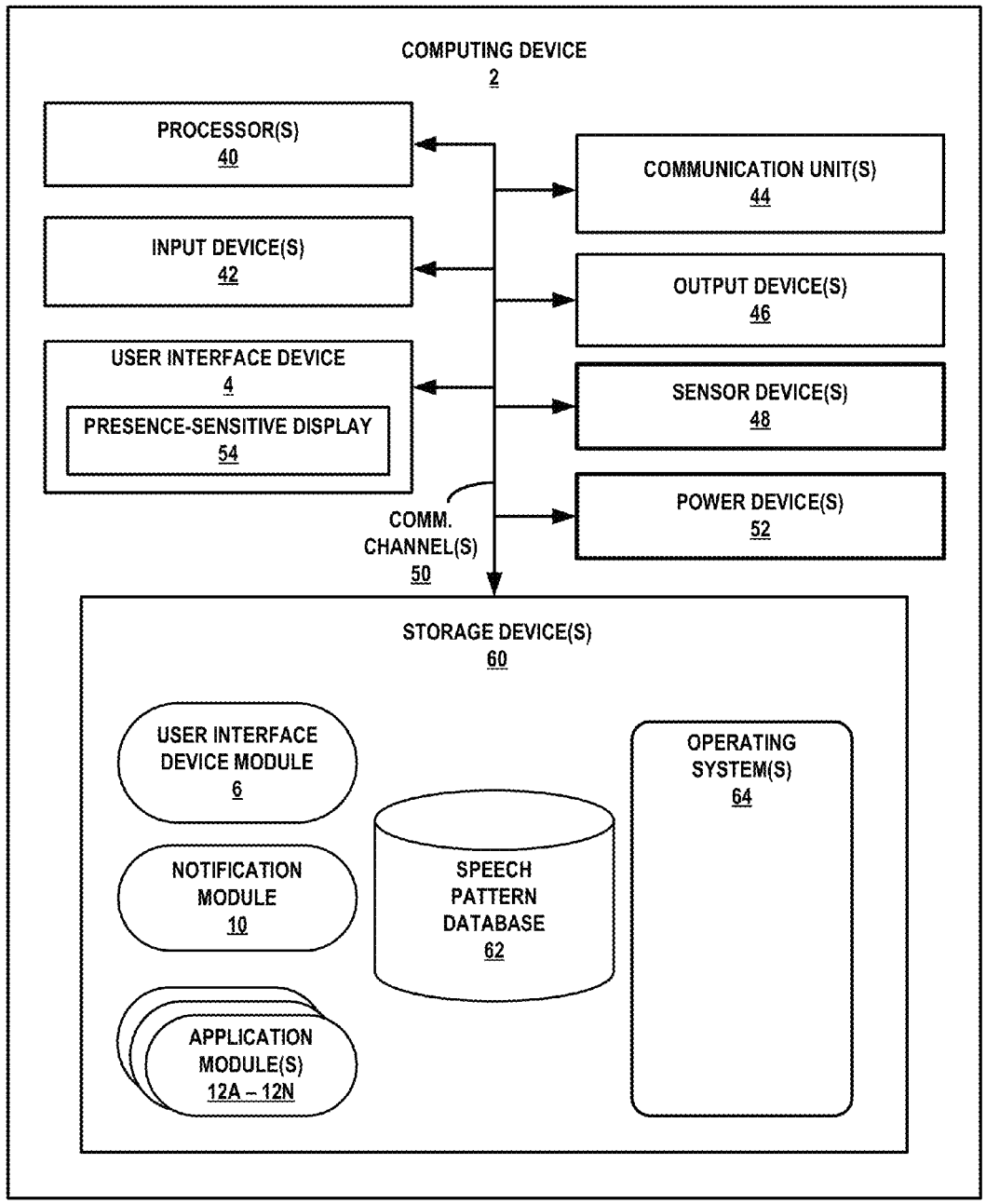
FIG. 2 is a block diagram illustrating an example computing device configured to delay output of a notification, in accordance with one or more aspects of the present disclosure.

FIG. 2 is a block diagram illustrating an example computing device 2 configured to delay output of a notification, in accordance with one or more aspects of the present disclosure. Computing device 2 of FIG. 2 is described below within the context of FIG. 1. FIG. 2 illustrates only one particular example of computing device 2, and many other examples of computing device 2 may be used in other instances. Other examples of computing device 2 may include a subset of the components included in example computing device 2 or may include additional components not shown in FIG. 2.

As shown in the example of FIG. 2, computing device 2 includes UID 4, one or more processors 40, one or more input devices 42, one or more communication units 44, one or more output devices 46, one or more sensors 48, one or more power sources 52, and one or more storage devices 60. Storage devices 60 of computing device 2 also include UID module 6, notification module 10, application modules 12A-12N, speech patterns database 62, and one or more operating systems 64. One or more communication channels 50 may interconnect each of the components 4, 40, 42, 44, 46, 48, 52, and 60 for inter-component communications (physically, communicatively, and/or operatively). In some examples, communication channels 50 may include a system bus, a network connection, an inter-process communication data structure, or any other method for communicating data.

One or more input devices 42 of computing device 2 may receive input. Examples of input are tactile, motion, audio, and video input. Input devices 42 of computing device 2, in one example, includes a presence-sensitive display, touch-sensitive screen, mouse, keyboard, voice responsive system, video camera, microphone or any other type of device for detecting input from, for example, a human or machine. In some examples, an input device 42 is a microphone, such as microphone 7 of FIG. 1.

One or more output devices 46 of computing device 2 may generate output. Examples of output are tactile, audio, and video output. Output devices 46 of computing device 2, in one example, includes a presence-sensitive display, speaker, cathode ray tube (CRT) monitor, liquid crystal display (LCD), motor, actuator, electromagnet, piezoelectric sensor, or any other type of device for generating output to a human or machine. Output devices 46 may utilize one or more of a sound card or video graphics adapter card to produce auditory or visual output, respectively. In some examples, an output device 46 is a speaker, such as speaker 8 of FIG. 1.

One or more communication units 44 of computing device 2 may communicate with external devices via one or more networks by transmitting and/or receiving network signals on the one or more networks. The one or more networks may be, for example, the Internet. Computing device 2 may use communication unit 44 to transmit and/or receive radio signals on a radio network such as a cellular radio network. Likewise, communication units 44 may transmit and/or receive satellite signals on a Global Navigation Satellite System (GNNS) network such as the Global Positioning System (GPS). Examples of communication unit 44 include a network interface card (e.g., an Ethernet card), an optical transceiver, a radio frequency transceiver, a GPS receiver, or any other type of device that can send or receive information. Other examples of communication units 44 may include Bluetooth®, GPS, 3G, 4G, and Wi-Fi® radios found in mobile devices as well as Universal Serial Bus (USB) controllers.

Computing device 2 also includes UID 4, which may include functionality of one or more input devices 42 and/or output devices 46. In the example of FIG. 2, UID 4 may be or may include a presence-sensitive display 54. In some examples, presence-sensitive display 54 may detect an object at and/or near presence-sensitive display 54. As one example range, presence-sensitive display 54 may detect an object, such as a finger or stylus that is within a specified range of presence-sensitive display 54. Presence-sensitive display 54 may determine a location (e.g., an (x,y) coordinate) of presence-sensitive display 54 at which the object was detected. A detectable object may be, for example, graphical element 30 of FIG. 1. Presence-sensitive display 54 may determine the location of presence-sensitive display 54 selected by a user's finger using capacitive, inductive, and/or optical recognition techniques. In some examples, presence-sensitive display 54 provides output to a user using tactile, audio, or video stimuli as described with respect to output device 46. In the example of FIG. 2, UID 4 presents a user interface (such as user interface 14 of FIG. 1) at presence-sensitive display 54 of UID 4.

While illustrated as an internal component of computing device 2, UID 4 also represents an external component that shares a data path with computing device 2 for transmitting and/or receiving input and output. For instance, in one example, UID 4 represents a built-in component of computing device 2 located within and physically connected to the external packaging of computing device 2 (e.g., a screen on a mobile phone). In another example, UID 4 represents an external component of computing device 2 located outside and physically separated from the packaging of computing device 2 (e.g., a monitor, a projector, etc. that shares a wired and/or wireless data path with a tablet computer).

One or more sensor devices 48 of computing device 2 may detect input, which may be user input. Example sensor devices 48 include an accelerometer, a gyroscope, an ambient light sensor, a proximity sensor, a barometer, magnetometer, or other sensor devices. Computing device 2 may include one or more of each sensor device. User input detected by sensor devices 48 may include data related to acceleration, orientation, light intensity, proximity of an object to computing device 2, an ambient pressure, magnetic field strength and polarity, or other sensor reading. In some examples, sensor devices 48 may be an input device 42. One or more sensor devices 48 may detect user input. For example, a gyroscope may detect changes in orientation when computing device 2 is handled by a user interacting with computing device 2.

Computing device 2 may include one or more power devices 52, which may provide power to computing device 2. In one example, power device 52 includes one or more batteries included in computing device 2. The one or more batteries may be rechargeable and provide power to computing device 2. The one or more batteries may, in some examples, be made from nickel-cadmium, lithium-ion, or other suitable material. In other examples, power device 52 may be a power source capable of providing stored power or voltage from another power source, which may be external to computing device 2.

One or more storage devices 60 within computing device 2 may store information for processing during operation of computing device 2 (e.g., characteristic database 62 of computing device 2 may store data related to characteristics of user inputs and corresponding characteristic threshold information as well as sensor input thresholds, accessed by access module 8 during execution at computing device 2). In some examples, storage device 60 functions as a temporary memory, meaning that storage device 60 is not used for long-term storage. Storage devices 60 on computing device 2 may be configured for short-term storage of information as volatile memory and therefore not retain stored contents if powered off. Examples of volatile memories include random access memories (RAM), dynamic random access memories (DRAM), static random access memories (SRAM), and other forms of volatile memories known in the art.

Storage devices 60, in some examples, also include one or more computer-readable storage media. Storage devices 60 may be configured to store larger amounts of information than volatile memory. Storage devices 60 may further be configured for long-term storage of information as non-volatile memory space and retain information after power on/off cycles. Examples of non-volatile memories include magnetic hard discs, optical discs, floppy discs, flash memories, or forms of electrically programmable memories (EPROM) or electrically erasable and programmable (EEPROM) memories. Storage devices 60 may store program instructions and/or data associated with UID module 6, notification module 10, and application modules 12.

One or more processors 40 may implement functionality and/or execute instructions within computing device 2. For example, processors 40 on computing device 2 may receive and execute instructions stored by storage devices 60 that execute the functionality of UID module 6, notification module 10, and application modules 12. These instructions executed by processors 40 may cause computing device 2 to store information within storage devices 60 during program execution. Processors 40 may execute instructions in UID module 6 and notification module 10 to cause one or more of application modules 12 to delay output of notifications at inopportune times (such as when a user is speaking or interacting with computing device 2).

In accordance with aspects of this disclosure, computing device 2 of FIG. 2 may output for display at presence-sensitive display 54 of UID 4, a graphical user interface that indicates information related to an application run at computing device 2, such as GUI 14 of FIG. 1. For example, when a notification is generated, notification module 10 of computing device 2 may determine whether the notification should be outputted at the particular time. Whether notification module 10 determines to delay or output the notification, UID module 6 may transmit a display command and data over communication channels 50 to cause UID 4 to a present user interface at presence-sensitive display 54 of UID 4. UID module 6 may send information to UID 4 that includes instructions for displaying user interface 14 at presence-sensitive display 54. UID 4 may receive the display command and data from UID module 6 and cause presence-sensitive display 54 of UID 4 to present a user interface, such as user interface 14 of FIG. 1.

Computing device 2 may receive an indication of user input detected at presence-sensitive display 54 of UID 4. Receiving the indication of user input may comprise receiving an indication of one or more gestures, taps, or the like detected at presence-sensitive display 54. Alternatively, receiving the indication of a user input detected at presence-sensitive display 54 of UID 4 may comprise receiving an indication of one or more non-tap gestures detected at presence-sensitive display 54. In other words, a user may provide tap and/or non-tap gestures as input to computing device 2, and computing device 2 may receive either type of input as an indication of user input. In some examples, UID module 6 may receive the indication of user input, analyze and interpret the user input, and provide data related to the received indication of user input to other modules of computing device 2, such as notification module 10.

In some examples, notification module 10 provides instructions for UID module 6 to output a notification. Notification module 10 may provide instructions for a different output device 46, such as speaker 8 of FIG. 1, to output the notification. Notification module 10 may provide instructions to output the notification based on notification module 10 detecting the occurrence of one or more conditions. These conditions may be, for example, a completion of an interaction with computing device 2 (such as a typed word is completed, a gesture is completed, a scrolling function is completed, etc.), an ambient noise level is below a threshold level, microphone 7 does not detect audio indicative of human speech, or a maximum delay time period is reached.

As shown in the example of FIG. 2, one or more storage devices 60 of computing device 2 may include speech pattern database 62. In some examples, speech pattern database 62 may be stored externally to computing device 2. In such an example, computing device 2 may access speech pattern database 62 remotely. Speech pattern database 62 may contain data related to characteristics of audio that are indicative of human speech. The characteristics may include, for example, tone, sound quality, type of sound, and the like. In some examples, speech pattern database 62 contains information related to an algorithm that may be used to determine if detected audio is indicative of human speech. In another example, speech pattern database 62 contains data representative of samples of human speech that notification module 10 may use to compare to detected audio to determine if the detected audio is indicative of human speech. Speech pattern database 62 may also include selected threshold levels for notification module 10 to match the detected audio to any particular speech pattern. Notification module 10 may use one or more of these selected threshold levels may to determine whether the detected audio is indicative of human speech. A threshold level may be any value determined by or set for computing device 2, and the threshold may be such that if the threshold is exceeded, it is likely that the detected audio is indicative of human speech. A value exceeding a threshold may mean the value is less than, less than or equal to, greater than or equal to, or greater than the threshold.

Notification module 10 may determine when to delay, and for how long, a notification. As such, notification module 10 can enable computing device 2 to provide notifications when they are more likely to be noticed and when they are less likely to interrupt an action being performed at computing device 2. Notification module 10 may be configured to prevent computing device 2 from outputting audio notifications when the environment, of computing device 2 is noisy. The techniques may further enable computing device 2 to delay outputting pop-up notifications until a time when notification module 10 determines that no user is physically interacting with computing device 2 (such as interacting with presence-sensitive display 54, scrolling, typing a message, or the like).

Figure 3:
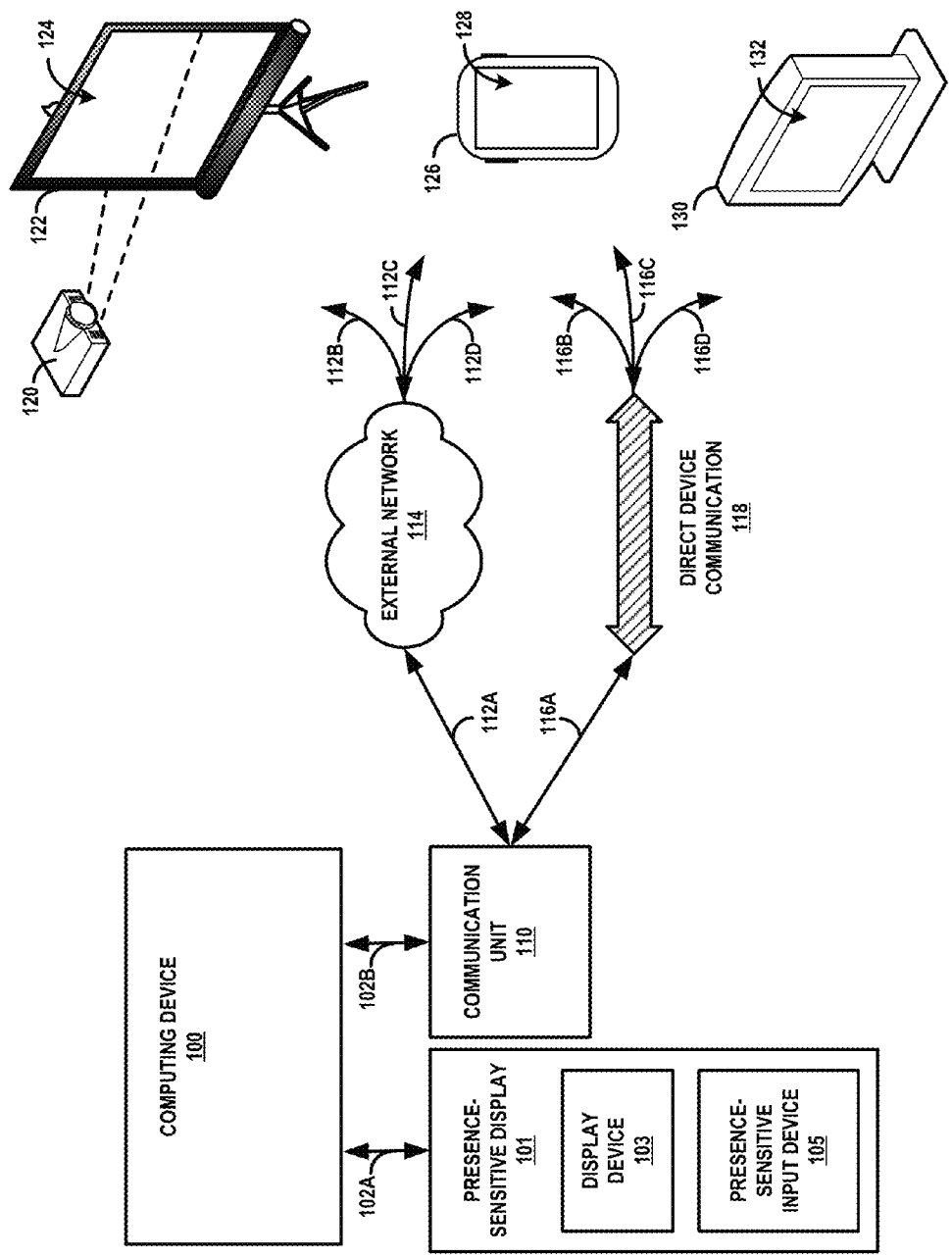
FIG. 3 is a block diagram illustrating an example computing device that outputs a notification at an opportune time, in accordance with one or more techniques of the present disclosure.

FIG. 3 is a block diagram illustrating an example computing device 100 that outputs graphical content for display at a remote device, in accordance with one or more techniques of the present disclosure. Graphical content, generally, may include any visual information that may be output for display, such as text, images, a group of moving images, etc. The example shown in FIG. 3 includes a computing device 100, presence-sensitive display 101, communication unit 110, projector 120, projector screen 122, mobile device 126, and visual display device 130. Although shown for purposes of example in FIGS. 1 and 2 as a stand-alone computing device 2, a computing device such as computing device 100 may, generally, be any component or system that includes a processor or other suitable computing environment for executing software instructions and, for example, need not include a presence-sensitive display.

As shown in the example of FIG. 3, computing device 100 may be a processor that includes functionality as described with respect to one or more processors 40 in FIG. 2. In such examples, computing device 100 may be operatively coupled to presence-sensitive display 101 by a communication channel 102A, which may be a system bus or other suitable connection. Computing device 100 may also be operatively coupled to communication unit 110, further described below, by a communication channel 102B, which may also be a system bus or other suitable connection. Although shown separately as an example in FIG. 3, computing device 100 may be operatively coupled to presence-sensitive display 101 and communication unit 110 by any number of one or more communication channels.

In other examples, such as illustrated previously by computing device 2 in FIGS. 1-2, a computing device may refer to a portable or mobile device such as mobile phones (including smart phones), laptop computers, etc. In some examples, a computing device may be a desktop computers, tablet computers, GPS devices, smart television platforms, cameras, personal digital assistants (PDAs), servers, mainframes, etc.

Presence-sensitive display 101, such as an example of user interface device 4 as shown in FIG. 1, may include display device 103 and presence-sensitive input device 105. Display device 103 may, for example, receive data from computing device 100 and display graphical content associated with the data. In some examples, presence-sensitive input device 105 may determine one or more user inputs (e.g., continuous gestures, multi-touch gestures, single-touch gestures, etc.) at presence-sensitive display 101 using capacitive, inductive, and/or optical recognition techniques and send indications of such user input to computing device 100 using communication channel 102A. In some examples, presence-sensitive input device 105 may be physically positioned on top of display device 103 such that, when a user positions an input unit over a graphical element displayed by display device 103, the location at which presence-sensitive input device 105 corresponds to the location of display device 103 at which the graphical element is displayed. In other examples, presence-sensitive input device 105 may be positioned physically apart from display device 103, and locations of presence-sensitive input device 105 may correspond to locations of display device 103, such that input can be made at presence-sensitive input device 105 for interacting with graphical elements displayed at corresponding locations of display device 103.

As shown in FIG. 3, computing device 100 may also include and/or be operatively coupled with communication unit 110. Communication unit 110 may include functionality of one or more communication units 44 as described in FIG. 2. Examples of communication unit 110 may include a network interface card, an Ethernet card, an optical transceiver, a radio frequency transceiver, or any other type of device that can send and receive information. Other examples of such communication units may include Bluetooth, 3G, and WiFi radios, Universal Serial Bus (USB) interfaces, etc. Computing device 100 may also include and/or be operatively coupled with one or more other devices, e.g., input devices, output devices, memory, storage devices, and the like, such as those shown in FIGS. 1 and 2.

FIG. 3 also illustrates a projector 120 and projector screen 122. Other such examples of projection devices may include electronic whiteboards, holographic display devices, and any other suitable devices for displaying graphical content. Projector 120 and projector screen 122 may include one or more communication units that enable the respective devices to communicate with computing device 100. In some examples, one or more communication units may enable communication between projector 120 and projector screen 122. Projector 120 may receive data from computing device 100 that includes graphical content. Projector 120, in response to receiving the data, may project the graphical content onto projector screen 122. In some examples, projector 120 may determine one or more user inputs (e.g., continuous gestures, multi-touch gestures, single-touch gestures, etc.) at projector screen using optical recognition or other suitable techniques and send indications of such user input using one or more communication units to computing device 100. In such examples, projector screen 122 may be unnecessary, and projector 120 may project graphical content on any suitable medium and detect one or more user inputs using optical recognition or other such suitable techniques.

Projector screen 122, in some examples, may include a presence-sensitive display 124. Presence-sensitive display 124 may include a subset of functionality or all of the functionality of UI device 4 as described in this disclosure. In some examples, presence-sensitive display 124 may include additional or different functionality. Projector screen 122 (e.g., an electronic whiteboard), may receive data from computing device 100 and display the graphical content. In some examples, presence-sensitive display 124 may determine one or more user inputs (e.g., continuous gestures, multi-touch gestures, single-touch gestures, etc.) at projector screen 122 using capacitive, inductive, and/or optical recognition techniques and send indications of such user input using one or more communication units to computing device 100.

FIG. 3 also illustrates mobile device 126 and visual display device 130. Mobile device 126 and visual display device 130 may each include computing and connectivity capabilities. Examples of mobile device 126 may include e-reader devices, convertible notebook devices, hybrid slate devices, etc. Examples of visual display device 130 may include other semi-stationary devices such as televisions, computer monitors, etc. As shown in FIG. 3, mobile device 126 may include a presence-sensitive display 128. Visual display device 130 may include a presence-sensitive display 132. Presence-sensitive displays 128, 132 may include a subset of functionality or all of the functionality of presence-sensitive display 54 as described in this disclosure. In some examples, presence-sensitive displays 128, 132 may include additional functionality. In any case, presence-sensitive display 132, for example, may receive data from computing device 100 and display the graphical content. In some examples, presence-sensitive display 132 may determine one or more user inputs (e.g., continuous gestures, multi-touch gestures, single-touch gestures, etc.) at projector screen 122 using capacitive, inductive, and/or optical recognition techniques and send indications of such user input using one or more communication units to computing device 100.

As described above, in some examples, computing device 100 may output graphical content for display at presence-sensitive display 101 that is coupled to computing device 100 by a system bus or other suitable communication channel. Computing device 100 may also output graphical content for display at one or more remote devices, such as projector 120, projector screen 122, mobile device 126, and visual display device 130. For instance, computing device 100 may execute one or more instructions to generate and/or modify graphical content in accordance with techniques of the present disclosure. Computing device 100 may output data that includes the graphical content to a communication unit of computing device 100, such as communication unit 110. Communication unit 110 may send the data to one or more of the remote devices, such as projector 120, projector screen 122, mobile device 126, and/or visual display device 130. In this way, computing device 100 may output the graphical content for display at one or more of the remote devices. In some examples, one or more of the remote devices may output the graphical content at a presence-sensitive display that is included in and/or operatively coupled to the respective remote devices.

In some examples, computing device 100 may not output graphical content at presence-sensitive display 101 that is operatively coupled to computing device 100. In other examples, computing device 100 may output graphical content for display at both a presence-sensitive display 101 that is coupled to computing device 100 by communication channel 102A, and at one or more remote devices. In such examples, the graphical content may be displayed substantially contemporaneously at each respective device. For instance, some delay may be introduced by the communication latency to send the data that includes the graphical content to the remote device. In some examples, graphical content generated by computing device 100 and output for display at presence-sensitive display 101 may be different than graphical content display output for display at one or more remote devices.

Computing device 100 may send and receive data using any suitable communication techniques. For example, computing device 100 may be operatively coupled to external network 114 using network link 112A. Each of the remote devices illustrated in FIG. 3 may be operatively coupled to network external network 114 by one of respective network links 112B, 112C, and 112D. External network 114 may include network hubs, network switches, network routers, etc., that are operatively inter-coupled thereby providing for the exchange of information between computing device 100 and the remote devices illustrated in FIG. 3. In some examples, network links 112A-112D may be Ethernet, ATM or other network connections. Such connections may be wireless and/or wired connections.

In some examples, computing device 100 may be operatively coupled to one or more of the remote devices included in FIG. 3 using direct device communication 118. Direct device communication 118 may include communications through which computing device 100 sends and receives data directly with a remote device, using wired or wireless communication. That is, in some examples of direct device communication 118, data sent by computing device 100 may not be forwarded by one or more additional devices before being received at the remote device, and vice-versa. Examples of direct device communication 118 may include Bluetooth, Near-Field Communication, Universal Serial Bus, Wi-Fi, infrared, etc. One or more of the remote devices illustrated in FIG. 3 may be operatively coupled with computing device 100 by communication links 116A-116D. In some examples, communication links 116A-116D may be connections using Bluetooth, Near-Field Communication, Universal Serial Bus, infrared, etc. Such connections may be wireless and/or wired connections.

In accordance with techniques of the disclosure, computing device 100 may be operatively coupled to visual display device 130 using external network 114. For example, computing device 100 may output a notification for display at presence-sensitive display 132 when computing device 100 determines the notification may be outputted. For instance, computing device 100 may send data that includes a representation of a notification to communication unit 110. Communication unit 110 may send the data that includes the representation of the notification to visual display device 130 using external network 114. Visual display device 130, in response to receiving the data using external network 114, may cause presence-sensitive display 132 to output the notification.

Figure 4:
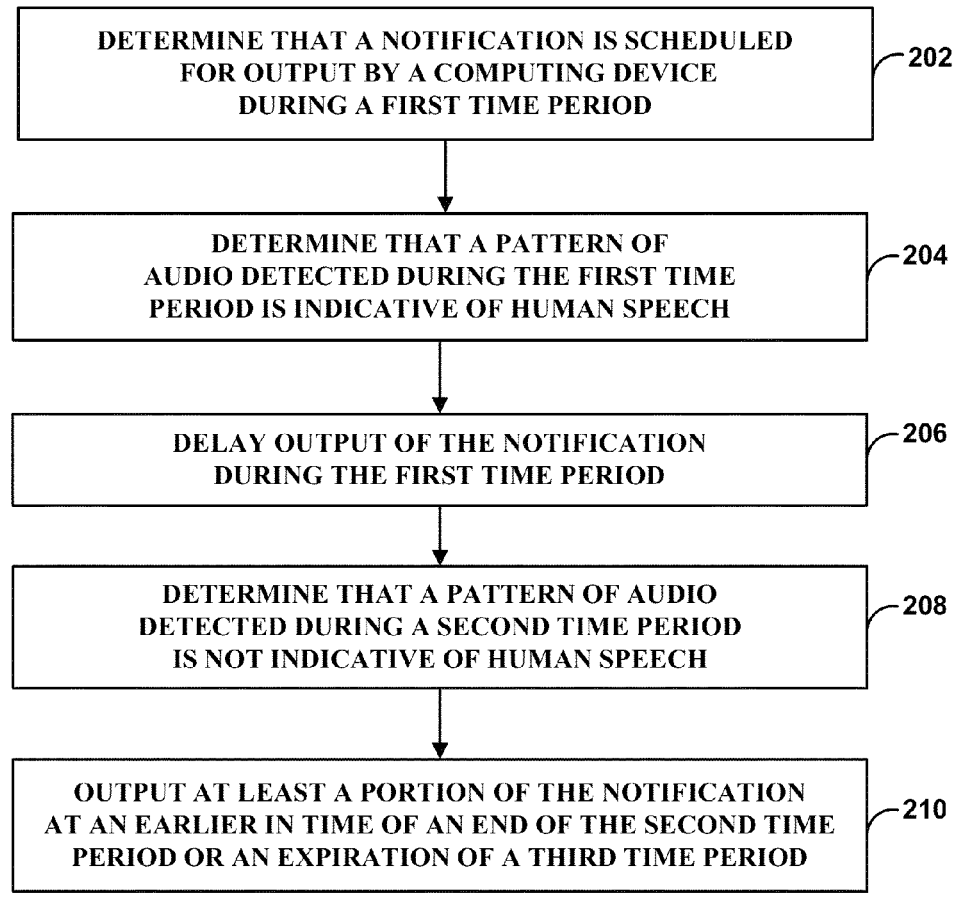
FIG. 4 is a flowchart illustrating an example operation of a computing device configured to delay output of a notification based at least partially on determination of a pattern of detected audio indicates human speech, in accordance with one or more aspects of the present disclosure.

FIG. 4 is a flowchart illustrating an example operation of a computing device configured to delay output of a notification based at least partially on determination of a pattern of detected audio that indicates human speech, in accordance with one or more aspects of the present disclosure. The computing device may be computing device 2 of FIGS. 1 and 2, or computing device 100 as described herein.

The example operations include determining, by a computing device, that a notification is scheduled for output by the computing device during a first time period (202). For example, an application run via an application module 12 determines a notification should be provided. The notification may be, for example, a pop-up graphical element, an audio-based notification, tactile feedback, or the like. For example, an application module 12 of computing device 2 determines that an audio notification is to be outputted. A notification may be scheduled for output whenever an application module 12 determines a notification for outputting. In some examples, application module 12 may schedule a notification in advance (e.g., a routine maintenance message, a calendar reminder, etc.) or may schedule a notification in an ad hoc manner (e.g., when computing device 2 receives a message, when a battery level reaches a charge threshold, etc.).

The example operations further include determining, by the computing device, that a pattern of audio detected during the first time period is indicative of human speech (204). For example, notification module 10 of computing device 2 determines that audio detected via microphone 7 is indicative of human speech. For example, notification module 10 queries a database, such as speech pattern database 62, for one or more stored human speech patterns. Notification module 10 compares the pattern of audio detected during the first time period with the one or more stored human speech patterns. Notification module 10 determines that the pattern of audio detected during the first time period is indicative of human speech when the pattern of audio detected during the first time period matches one of the one or more stored human speech patterns within a threshold matching level.

The example operations also include delaying, by the computing device, output of the notification during the first time period (206). That is, for example, notification module 10 delays output of the notification during the first time period because notification module 10 determined that there was an audio pattern indicative of human speech detected proximate to computing device 2 during the first time period.

The operations further include determining, by the computing device, that a pattern of audio detected during the second time period is not indicative of human speech (208). In some examples, notification module 10 determines that the pattern of audio detected during the second time period is not indicative of human speech when the pattern of audio detected during the second time period does not match one of the one or more stored human speech patterns of speech pattern database 62 within the threshold matching level.

The example operations may further include outputting, by the computing device, at least a portion of the notification at an earlier in time of an end of the second time period or an expiration of a third time period (210). For example, notification module 10 instructs one or more output devices 46, such as speaker 8, to output at least a part of the notification. The operation may further include determining, by the computing device, which portion of the notification to output based at least in part on the pattern of audio detected during the second time period. For example, if notification module 10 determined there was a lull in a detected conversation during the second time period, then notification module 10 may determine to only output a portion of the notification that would fit within the lull.

The operations may further include monitoring, by the computing device, audio detected by a microphone, wherein the audio is detected during at least the first time period and the second time period. For example, computing device 2 receives audio data in the environment of computing device 2 via microphone 7. The audio may be detected during at least a first time period and a second time period. For example, microphone 7 may detect the audio continuously, discontinuously, or sporadically during the first and second time periods. In some examples, a computing device 2 may include a separate module for detecting speech in the audio data.

In some examples, the third time period is a selected maximum delay period. Notification module 10 may determine a type of the notification, and the duration of the third time period is based on the determined type of the notification. For an example where the notification is an audio notification of a turn from a navigation application, for example, the third time period may be based on a time it will take for a vehicle transporting computing device 2 to arrive at a turn.

Additionally, notification module 10 may determine that the pattern of audio detected during the second time period indicates the second time period is suitable for outputting the entire notification, wherein outputting at least the portion of the notification comprises outputting the entire notification. In some examples, outputting at least the portion of the notification further comprises outputting at least the portion of the notification when the ambient noise level is below a threshold noise level.

In examples where the notification is an audio notification, speaker 8 may output least a portion of the audio notification. In some examples, computing device 2 executes a navigation application using an application module 12. The navigation application may generate, at a beginning of the first time period via application module 12, the audio notification that includes directional information. Notification module 10 may determine the third time period based on the beginning of the first time period and a time when at least part of the directional information would become incorrect. For example, a GPS system in a car detects if the passengers are speaking, and alerts the driver of upcoming directions when the passengers in the car are silent so that it does not interrupt anyone (if the GPS system still has enough time to deliver the message). In some examples, notification module 10 may differentiate between voices of different speakers that microphone 7 detects, and may use this information to determine when to output the notification.

The notification may be a notification for an incoming request for a communication, such as a received phone call, in some examples. Computing device 2 may receive an incoming request for communication. Computing device 2 may generate, at a beginning of the first time period, the audio notification that indicates the request for communication has been received. Notification module 10 may determine the third time period based on the beginning of the first time period and a time when the request for communication would expire.

In some examples, computing device 2 does not record the audio detected via microphone 7. For example, computing device 2 does not store a copy of the audio in any storage device, such as storage device 60. In this sense, computing device 2 is not "listening" to any conversations or determining the content of the conversations. Instead, even though microphone 7 may be receiving audio data, computing device 2 does not make any records or determines the contents of the audio data.

In another example, if a user is speaking near computing device 2, notification module 10 may output portions of the notification to alert the user of the information to reduce a likelihood of interrupting the user. For example, notification module 10 may output part of a notification during a quiet moment of a conversation when computing device 2 is functioning as a cell phone. In another example, if an email application receives an email into an inbox while a user is composing an email, notification module 10 delays outputting the notification until the user stops typing. In some examples, an additional pause threshold, such as thirty seconds or one minute, may be reached before notification module 10 instructs an output device to output the notification. In another example, notification module 10 defers interruption if a user is in the midst of performing an operation, such as a scroll operation, and has not yet completed the operation.

Thus, a computing device 2 configured to perform techniques described herein may wait to give audio notifications, such as driving directions, until determining that people have stopped talking, to reduce the likelihood that someone speaks over the instructions. Computing device 2 may interrupt user actions, such as scrolling or speaking, upon certain conditions, such as before a vehicle transporting computing device 2 passes a road to turn onto indicated in the instructions. Thus, computing device 2 may perform an intelligent interruption through receiving audio data via microphone 7 and analyzing the audio data to determine if someone is speaking proximate to computing device 2.

Thus, computing devices implementing techniques described herein can suppress notifications until a suitable output time is determined. Notification module 10 may not deliver a notification immediately upon its generation and instead may take into account an environment of computing device 2 or how a user is interacting with computing device 2. Notifications may not interrupt the user as often, which causes UID 4 to behave in a more predictable manner and leads to improved user experience. In contrast, for example, if a user is trying to tap on a particular graphical element displayed on GUI 14 and, while the user is moving a finger to tap on the graphical element, notification module 10 causes a notification to be outputted over the graphical element, the user may tap on the notification instead of the graphical element. Furthermore, computing device 2 does not merely schedule notifications to appear at a certain time, because there is no guarantee that a user will not be attempting to interact with computing device 2 at the scheduled time.

A computing device configured according to techniques described herein may output notifications in response to determining that there is a pause in the user's interactions with other users or with the computing device. The computing device may output notifications that require immediate output right way while delaying the output of other, less urgent, notifications for up to some period of time (e.g., 0.1 seconds, 1 second, etc.). Each different notification type may have a different delay threshold (e.g., 100 milliseconds for a text message, 2 seconds for an email, 5 seconds for navigation directions, etc.). If the condition causing the delay of the notification is still present at the expiration of the delay window, the computing device outputs the notification. Thus, techniques described herein provide a way for computing device 2 to minimize the distractions caused by notifications (e.g., by not interrupting a current user task) while also increasing the likelihood that the user will actually receive the notification.

In one or more examples, the functions described may be implemented in hardware, software, firmware, or any combination thereof. If implemented in software, the functions may be stored on or transmitted over, as one or more instructions or code, a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media, which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a hardware unit or provided by a collection of interoperative hardware units, including one or more processors as described above, in conjunction with suitable software and/or firmware.

Various examples have been described in this disclosure. These and other examples are within the scope of the following claims.

What is claimed is:

1. A method comprising:
   executing, by a computing device, a navigation application;
   determining, by the computing device, that a notification is scheduled for output by the computing device during a first time period;
   generating, by the navigation application and responsive to commencement of the first time period, the notification, wherein the notification includes directional information;
   responsive to determining that a pattern of audio detected during the first time period is indicative of human speech, delaying, by the computing device, output of the notification during the first time period;
   determining a maximum delay period for output of the notification based on a time of commencement of the first time period and a time at which at least part of the directional information would become incorrect; and
   outputting, by the computing device, at least a portion of the notification responsive to a first to occur of (1) determining that a pattern of audio detected during a second time period is not indicative of human speech and (2) an expiration of the maximum delay period for output of the notification.

2. The method of claim 1, further comprising:
   determining, by the computing device, which portion of the notification to output based at least in part on the pattern of audio detected during the second time period.

3. The method of claim 1, further comprising:
   continuously monitoring and analyzing audio detected by a microphone operatively coupled to the computing device,
   storing a representation of the audio to a storage device; and
   analyzing the representation of the audio.

4. The method of claim 1, further comprising:
   determining a type of the notification; and
   selecting a duration of the maximum delay period based at least in part on the type of the notification.

5. The method of claim 1, further comprising:
   determining that the pattern of audio detected during the second time period indicates that the second time period is suitable for outputting an entirety of the notification, wherein outputting at least the portion of the notification comprises outputting the entirety of the notification.

6. The method of claim 1, wherein determining that the pattern of audio detected during the first time period is indicative of human speech further comprises:
   querying a database for one or more stored human speech patterns;
   comparing the pattern of audio detected during the first time period with the one or more stored human speech patterns; and
   determining that the pattern of audio detected during the first time period is indicative of human speech in response to determining that the pattern of audio detected during the first time period matches one of the one or more stored human speech patterns within a threshold matching level.

7. The method of claim 1, further comprising:
   monitoring, by the computing device, an ambient noise level of audio,
   wherein outputting at least the portion of the notification further comprises outputting at least the portion of the notification responsive to the ambient noise level being below a threshold noise level.

8. The method of claim 1, wherein the notification comprises an audio notification, and wherein outputting at least a portion of the audio notification further comprises outputting, by a speaker, at least a portion the audio notification.

9. The method of claim 8, further comprising:
   receiving, by the computing device, an incoming request for communication;
   generating, by the computing device at commencement of the first time period, the audio notification that indicates the request for communication has been received; and
   determining the maximum delay period based on the time of commencement of the first time period and a time when the request for communication would expire.

10. A computing device, comprising:
    a microphone;
    an output device; and
    one or more processors operable to:
       execute a navigation application;
       determine that a notification is scheduled for output by the computing device during a first time period;
       generate, by the navigation application and responsive to commencement of the first time period, the notification, wherein the notification includes directional information;
       responsive to determining that a pattern of audio detected during the first time period is indicative of human speech, delay output of the notification during the first time period;
       determine a maximum delay period for output of the notification based on a time of commencement of the first time period and a time at which at least part of the directional information would become incorrect; and
       output at least a portion of the notification responsive to a first to occur of (1) determining that a pattern of audio detected during a second time period is not indicative of human speech and (2) an expiration of the maximum delay period for output of the notification.

11. The computing device of claim 10, wherein the one or more processors is further operable to:
    determine which portion of the notification to output based at least in part on the pattern of audio detected during the second time period.

12. The computing device of claim 10, wherein the one or more processors is further operable to:
    determine a type of the notification; and
    select a duration of the maximum delay period based at least in part on the type of the notification.

13. The computing device of claim 10, wherein determine that the pattern of audio detected during the first time period is indicative of human speech further comprises:
   query a database for one or more stored human speech patterns;
   compare the pattern of audio detected during the first time period with the one or more stored human speech patterns; and
   determine that the pattern of audio detected during the first time period is indicative of human speech when the pattern of audio detected during the first time period matches one of the one or more stored human speech patterns within a threshold matching level.

14. The computing device of claim 10, wherein the notification comprises a first notification, and wherein the one or more processors is further operable to:
   receive an incoming request for communication;
   generate, at commencement of the first time period, a second notification to indicate the request for communication has been received; and
   determine a maximum delay period for the second notification based on the time of commencement of the first time period and a time when the request for communication would expire.

15. A non-transitory computer-readable storage medium encoded with instructions that, when executed by one or more processors of a computing device, cause the one or more processors to:
   execute a navigation application;
   determine that a notification is scheduled for output by the computing device during a first time period;
   generate, by the navigation application and responsive to commencement of the first time period, the notification, wherein the notification includes directional information;
   responsive to determining that a pattern of audio detected during the first time period is indicative of human speech, delay output of the notification during the first time period;
   determine a maximum delay period for output of the notification based on a time of commencement of the first time period and a time at which at least part of the directional information would become incorrect; and
   output at least a portion of the notification responsive to a first to occur of (1) determining that a pattern of audio detected during a second time period is not indicative of human speech and (2) an expiration of the maximum delay period for output of the notification.

16. The non-transitory computer-readable storage medium of claim 15, wherein the instructions further cause the one or more processors to:
   determine a type of the notification; and
   select a duration of the maximum delay period based at least in part on the type of the notification.

17. The non-transitory computer-readable storage medium of claim 15, wherein the instructions further cause the one or more processors to:
   query a database for one or more stored human speech patterns;
   compare the pattern of audio detected during the first time period with the one or more stored human speech patterns; and
   determine that the pattern of audio detected during the first time period is indicative of human speech when the pattern of audio detected during the first time period matches one of the one or more stored human speech patterns within a threshold matching level.

18. The method of claim 2, wherein determining which portion of the notification to output comprises determining to output only a portion of the notification that would fit within a lull in a detected conversation during the second time period.

19. The method of claim 1, wherein the portion of the notification includes the directional information, further comprising:
   outputting the directional information responsive to determining that the pattern of audio detected during the second time period is not indicative of human speech if the maximum delay period has not yet been reached; and
   outputting the directional information before determining that a pattern of audio detected during the second time period is not indicative of human speech if the maximum delay period has been reached before the directional information becomes incorrect.

* * * * *